Feb. 5, 1957 A. A. LAHTI 2,780,780
ELECTROSTATIC VOLTMETER
Filed Feb. 23, 1952 3 Sheets-Sheet 1
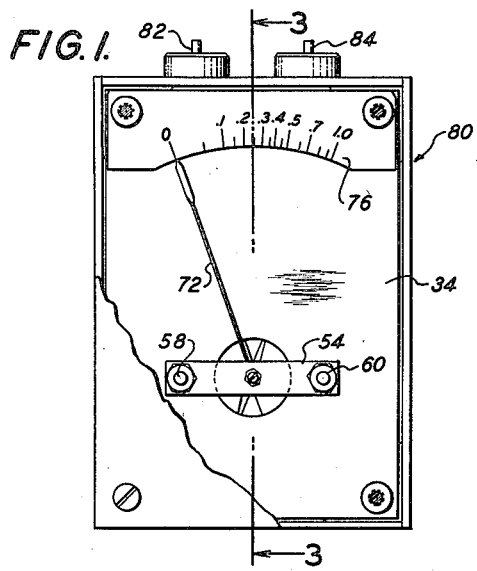
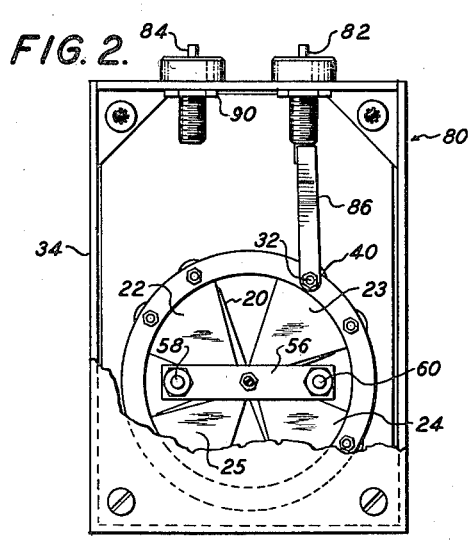
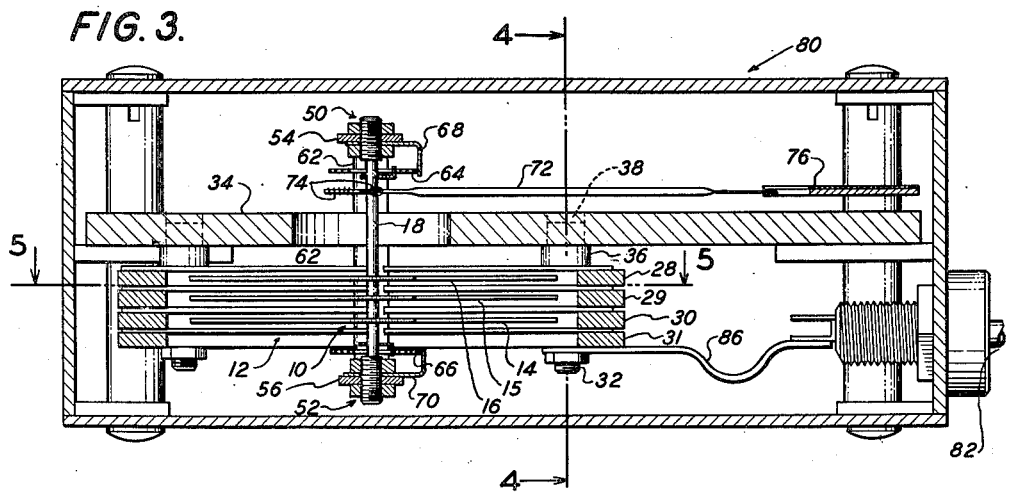
INVENTOR.
ARVO A. LAHTI
BY James B. Christie
ATTORNEY

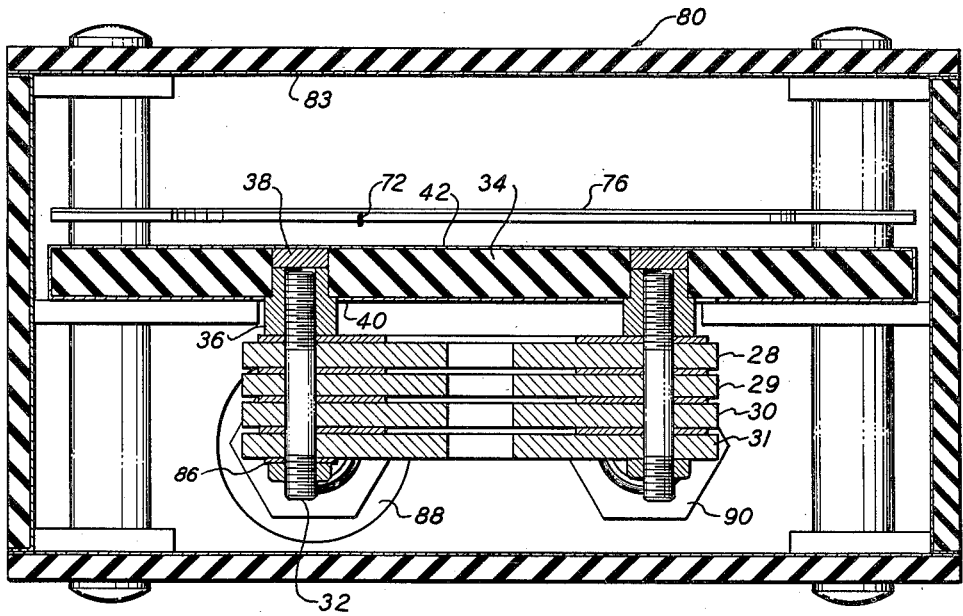

United States Patent Office 2,780,780
Patented Feb. 5, 1957

2,780,780

ELECTROSTATIC VOLTMETER

Arvo A. Lahti, Pasadena, Calif., assignor, by mesne assignments, to Consolidated Electrodynamics Corporation, Pasadena, Calif., a corporation of California Application February 23, 1952, Serial No. 272,953

2 Claims. (Cl. 324—109)

This invention relates to an improved electrostatic voltmeter.

Electrostatic voltmeters are ordinarily employed when it is necessary to measure electric voltages with substantially no current drain through the measuring device. Conventional electrostatic voltmeters have responses which are proportional either to the applied voltage or to the square of the applied voltage. Such voltmeters provide accurate indications of the magnitude of the voltage for high readings on the voltmeter scale, but the accuracy of low readings on the scale is poor. If the response of the voltmeter is proportional to the applied voltage, a reading error remains substantially constant throughout the scale of the meter insofar as the absolute value of the error is concerned, and this results in greater per unit errors for low readings than for high readings on the scale. If the response of the voltmeter is proportional to the square of the applied voltage the per unit errors for low readings on the scale are even larger.

When such electrostatic voltmeters are employed in radiation rate meters to measure the voltage drop across a metering resistor, it is ordinarily necessary to provide an arrangement for changing the voltage range of the voltmeter so that small voltages can be measured with accuracy. Such arrangements for changing the range of the voltmeter are difficult to construct, and they usually introduce an error in the readings.

These difficulties are overcome in my invention by providing an electrostatic voltmeter having rotor and stator plates arranged so as to cause the response of the voltmeter to be substantially proportional to the square root of the applied voltage. Such an arrangement provides accurate indications of the voltage for low readings on the scale of the meter, and the response for high readings on the scale is satisfactory for most purposes. The voltmeter of my invention is particularly suitable for measuring the voltage drop across the metering resistor in a radiation rate meter because the voltmeter provides accurate indications for the low readings where accuracy is ordinarily required.

The response of an electrostatic voltmeter is directly related to the capacity function of the structure, and the capacity function is determined by the geometry of the structure. The response of an electrostatic voltmeter may be expressed as follows:

$$\theta = \frac{V^2}{2K} \frac{\partial C}{\partial \theta}$$

Where:

$\theta$ is the angular deflection of the rotor, $K$ is a system constant dependent upon the spring constant and the units in which the other parameters are measured, $V$ is the voltage, and $C$ is the capacity between the rotor and the stator.

It will be apparent from an inspection of the above equation that various structural arrangements may be employed in order to obtain an angular response which is proportional to the square root of the applied voltage. By assuming the geometry of one electrode, for example the stator, the geometry of the other electrode can be deduced by utilizing rigorous or graphical calculus. Because of the nature of the dependence of the response of an electrostatic voltmeter on the geometry of the electrodes, the assumption of the geometry of one electrode ordinarily results in a complex geometry for the other electrode so that it is difficult to construct.

In accordance with my invention, I provide an electrostatic voltmeter of simple construction which has an angular response which is substantially proportional to the square root of the voltage which is applied to the meter. The rotor of the voltmeter comprises one or more members having a plurality of triangularly-shaped vanes angularly spaced equidistant apart around a common central portion which in turn is supported by a rotatable member. The stator plates of the voltmeter are shaped like pieces of pie and they extend inwardly from an annular support. The inner ends of the stator plates are truncated and curved so as to provide the desired response at high readings on the scale.

The rotor vanes and the stator plates are arranged so that the leading edges of the vanes and the stator plates are aligned when the voltmeter is de-activated. When voltage is applied to the meter the electrostatic forces cause the rotor to move between the stator plates and thereby change the capacitance of the meter so that the angular deflection of the rotor varies in accordance with the square root of the voltage which is applied to the voltmeter.

The voltmeter is housed in a case composed of an insulating material so as to provide a high leakage resistance between the rotor and stator assemblies. Conductive paint is applied to the interior surfaces of the case so as to shield the voltmeter from the effects of external fields.

The invention will be explained with reference to the drawings, in which:

Fig. 1 is a front view, partially broken away, of a preferred embodiment of the electrostatic voltmeter;

Fig. 2 is a back view, partially broken away, of the voltmeter of Fig. 1;

Fig. 3 is an enlarged sectional view of the voltmeter taken along line 3—3 of Fig. 1;

Fig. 4 is an enlarged sectional view taken along line 4—4 of Fig. 3; and

Figure 5:
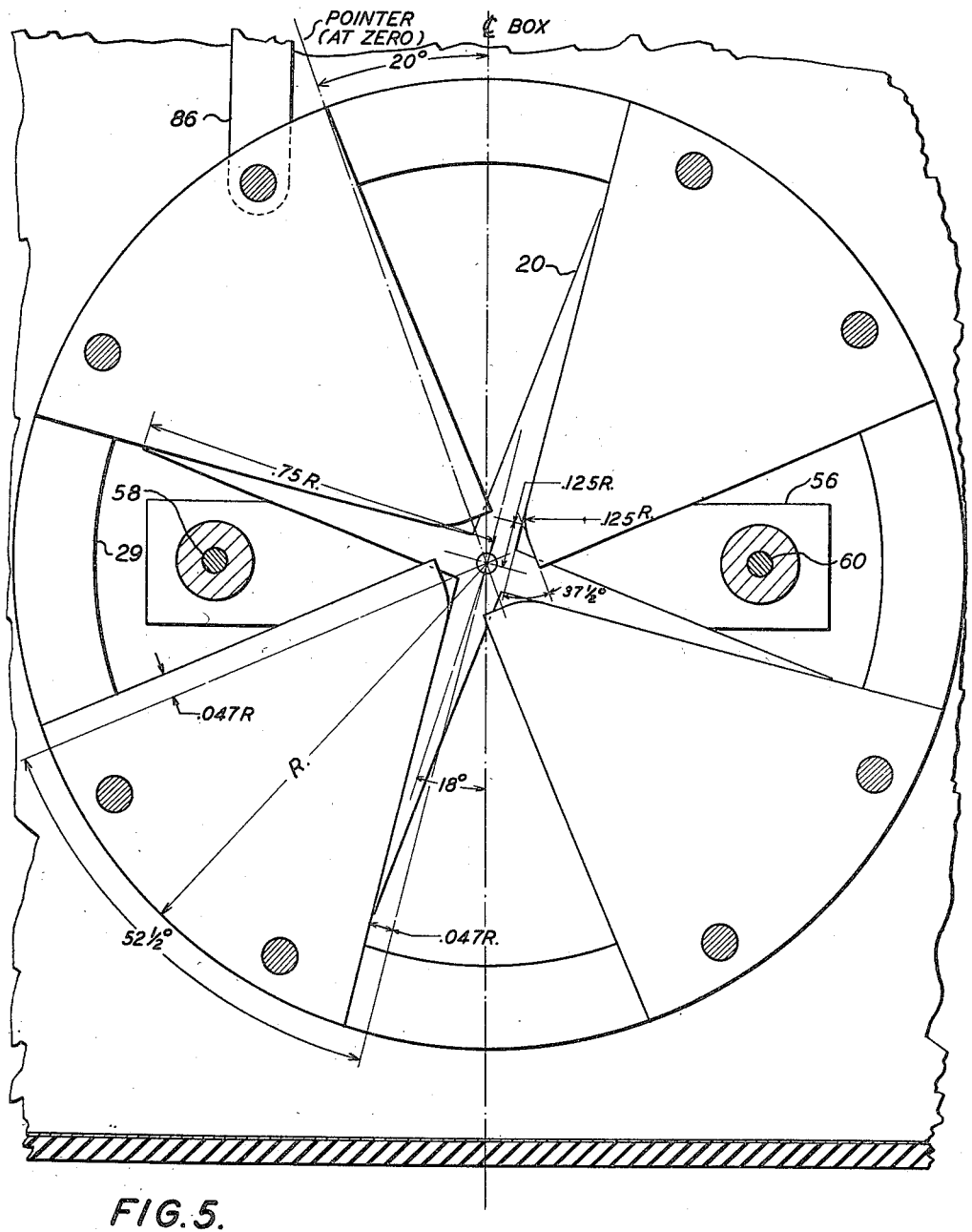
Fig. 5 is an enlarged sectional view taken along line 5—5 of Fig. 3.

Referring particularly to Figs. 1 to 3 of the drawings, the voltmeter comprises a rotor 10 and a stator assembly 12.

The rotor consists of three identical rotor members 14 to 16 which are secured to a conductive shaft 18. Each of the rotor members has four vanes 20 of triangular shape which are angularly spaced equidistant apart about a common central portion which is attached to the shaft 18. The bases of the triangularly-shaped vanes are located at the common central portion.

The rotor members should be of light weight. An alloy of aluminum such as Duralumin is satisfactory.

The stator assembly consists of four sets 22 to 25 of plates, and each set of plates consists of four aligned plates which are shaped substantially like a piece of pie. The stator plates are held in place by four conductive rings 28 to 31 and by a plurality of studs 32.

The rotor and the stator of the meter are mounted on a support 34 which is composed of a low loss insulating material such as polystyrene. The studs 32 are threaded into bushings 36, which are also composed of an insulating material such as polystyrene, and the bushings are cemented to the support 34. A cap 38, which is also composed of an insulating material, is provided for each of the bushings so as to provide a smooth surface on the front side of the support 34.

The surfaces of the support 34, with the exception of the portions 40 of the support around each of the bushings 36, are provided with a coating 42 of conductive paint (see Fig. 4). Thus, the stator assembly is mounted on the support 34 in such manner that a high leakage resistance between the stator assembly and the conductive paint is provided.

The shaft of the rotor is rotatably mounted in a pair of jewel bearings 50, 52 which are secured to two conductive strips 54, 56 located on opposite sides of the support 34. The strips 54, 56 are supported by a pair of studs 58, 60 and conductive spacers 62. A pair of hairsprings 64, 66 which are located at the ends of the shaft 18 are provided to bias the rotor. The springs are connected between the shaft 18 and a pair of conductive brackets 68, 70, which in turn are secured to the strips 54 and 56. The springs are soldered to both the shaft and the respective brackets so as to provide a conductive path between the rotor and the support. Thus, the rotor of the meter is electrically connected to the conductive paint on the support member 34.

A pointer 72 is affixed to the rotor shaft 18, and the pointer is provided with counter-weights 74 for balancing the pointer assembly so as to assure non-geotropism.

A scale 76 is provided for indicating the deflection of the pointer 72. As shown in Fig. 1, this scale is graduated on a per unit basis, with full scale deflection of the meter equal to unity. It will be apparent that the scale may be graduated in terms of the actual voltage range being measured if desired.

A box 80, having a removable front and back, serves as a housing for the voltmeter. A pair of terminals 82, 84 are provided at the top of the box for connecting a source of a voltage to be measured between the rotor and the stator of the meter. The terminal 82 is connected to the stator plates through a conductive strip 86.

The box 80 is composed of an insulating material such as polystyrene, and the interior surfaces of the box, with the exception of a window (not shown) for viewing the scale 76 and a portion 88 around the terminal 82, are covered with a coating 83 of conductive paint (see Fig. 4). Thus, the conductive paint in the interior of the box 80 serves to shield the voltmeter from the effects of external fields.

The terminal 84 is connected directly to the conductive paint in the interior of the box by a nut 90. Hence the terminal 84 is electrically connected to the rotor of the voltmeter through the conductive paint inside the box and the conductive paint on the support member 34.

Fig. 5 shows the shape and relative dimensions of a preferred embodiment of the rotor members and the stator plates. Each of the rotor members is provided with four vanes 20 shaped in the form of identical isosceles triangles angularly spaced equidistant apart around a common central portion. The dimensions of the bases of the vanes are of the order of one-eighth the altitude of the vanes.

The stator plates are pie-shaped and are located so that when the meter is de-activated, the leading edges of the rotor vanes and stator members are aligned, as shown in Fig. 5. The inner ends of the stator plates are truncated and are provided with a slight curvature so as to cause the voltmeter to provide accurate indications at high readings on the scale.

When a voltage is applied between the terminals 82, 84, the electrostatic forces cause the rotor to move between the stator plates. Due to the geometry and relative locations of the rotor and the stator plates, the capacitance of the meter changes as the rotor moves between the stator plates so that the angular deflection of the rotor varies substantially in accordance with the square root of the voltage which is applied to the voltmeter.

The voltmeter arrangement shown in Figs. 1 to 5 provides a maximum reading of 1000 volts when the dimension R is one inch.

In the embodiment of the invention disclosed herein, three rotor members and the associated stator plates are employed in order to obtain high voltage sensitivity. It will be apparent that different numbers of rotor members and stator plates may be employed if a different voltage sensitivity is required.

I claim:

1. An electrostatic voltmeter comprising at least one rotor member having a central portion and a plurality of vanes shaped in the form of identical isosceles triangles extending from the central portion and angularly spaced equidistant apart with the bases of the triangular-shaped vanes located at the common central portion, a rotatable shaft extending through said central portion for supporting the rotor member, spring biasing means attached to the rotatable shaft, and a plurality of sets of stator plates located around the rotatable shaft with the number of sets of stator plates corresponding to the number of rotor vanes and each set of stator plates providing a pair of aligned plates located on each side of the plane of rotation of the rotor member, the stator plates being shaped substantially in the form of a piece of pie with the outer ends of the respective plates extending along an arc of approximately 50° and with the inner ends of the respective plates being truncated along lines forming approximately a 37½° angle with respect to the leading edges of the respective stator plates, the bases of the isosceles triangles formed by the respective vanes being approximately one-eighth the altitudes of the triangles and the altitudes of the triangles being approximately three-quarters of the distance from the rotatable shaft to the outer periphery of the stator plates, the leading edges of the respective vanes of the rotor being aligned with the leading edges of the respective pairs of stator plates when the voltmeter is de-activated so that the angular deflection of the rotor member varies substantially in accordance with the square root of the voltage applied between the rotor member and the stator plates.

2. An electrostatic voltmeter comprising at least one rotor member having a central portion and a plurality of vanes shaped in the form of identical isosceles triangles extending from the central portion and angularly spaced equidistant apart with the bases of the triangular-shaped vanes located at the common central portion, a rotatable shaft extending through said central portion for supporting the rotor member, spring biasing means attached to the rotatable shaft, and a plurality of sets of stator plates located around the rotatable shaft with the number of sets of stator plates corresponding to the number of rotor vanes and each set of stator plates providing a pair of aligned plates located on each side of the plane of rotation of the rotor member, the stator plates being shaped substantially in the form of a piece of pie, the bases of the isosceles triangles formed by the respective vanes being approximately one-eighth the altitudes of the triangles, the leading edges of the respective vanes of the rotor being aligned with the leading edges of the respective pairs of stator plates when the voltmeter is de-activated so that the angular deflection of the rotor member varies substantially in accordance with the square root of the voltage applied between the rotor member and the stator plates.

References Cited in the file of this patent

UNITED STATES PATENTS

| | | |
|---|---|---|
| 554,275 | Kelly | Feb. 11, 1896 |
| 637,785 | Hewlett | Nov. 28, 1899 |
| 1,592,775 | Lissen | July 13, 1926 |
| 2,423,100 | Handley | July 1, 1947 |

FOREIGN PATENTS

| | | |
|---|---|---|
| 363,645 | Great Britain | Dec. 21, 1931 |